United States Patent [19]

Pellenc

[11] Patent Number: 5,791,129
[45] Date of Patent: Aug. 11, 1998

[54] MACHINE FOR AUTOMATIC OR SEMIAUTOMATIC TRIMMING OR CUTTING OF VINE AND ESPALIER-TRAINED TREES OR SHRUBS

[75] Inventor: Roger Pellenc, Pertuis, France

[73] Assignee: Pellenc, Pertuis, France

[21] Appl. No.: 600,869

[22] Filed: Feb. 13, 1996

[30] Foreign Application Priority Data

Feb. 15, 1995 [FR] France ................... 95 02003

[51] Int. Cl.⁶ ........................................ A01D 55/00
[52] U.S. Cl. .................... 56/15.1; 56/331; 56/234
[58] Field of Search .................. 56/15.1, 330, 331, 56/503, 235, 234, 255, 328.1, 327.1

[56] References Cited

U.S. PATENT DOCUMENTS

| | | | |
|---|---|---|---|
| 2,532,174 | 11/1950 | Lieberman | 56/255 |
| 3,889,454 | 6/1975 | Bruel | 56/330 |
| 4,174,601 | 11/1979 | Griffin | 56/503 X |
| 4,578,937 | 4/1986 | West et al. | 56/330 X |
| 4,733,525 | 3/1988 | Pellenc | 56/503 |

FOREIGN PATENT DOCUMENTS

0147344  7/1985  European Pat. Off. .

*Primary Examiner*—Terry Lee Melius
*Assistant Examiner*—Heather Shackelford
*Attorney, Agent, or Firm*—Greenblum & Bernstein P.L.C.

[57] ABSTRACT

Machine for the automatic or semi-automatic trimming or cutting of vines and espalier-trained trees or shrubs. The machine includes at least one cutting assembly constituted by a plurality of cutting tools stacked about a common shaft. Each of these cutting tools includes a rotative circular cage having the shape of a scalloped disk with notches extending toward the cage interior and demarcated by teeth (5). The teeth include an extreme portion and superposed bars. The superposed bars extend from this extreme portion in the direction of the rotational axis of the rotating cage. Each of these cutting tools also includes an interior member which participates in the cutting action, and is housed in the rotating cage. The extreme portion of the teeth of the rotating cages forms a projecting angle, and the inclined edges of this pointed portion are provided with at least one notch.

12 Claims, 7 Drawing Sheets

MACHINE FOR AUTOMATIC OR SEMIAUTOMATIC TRIMMING OR CUTTING OF VINE AND ESPALIER-TRAINED TREES OR SHRUBS

BACKGROUND OF THE INVENTION

1. Field of the Invention

The present invention relates to a machine for the automatic or semi-automatic trimming or cutting of vine and espalier-trained trees or shrubs in which the climbing stems, twigs, or branches are held by superposed wires supported by spaced stakes. In the case of vines, notably, the number of these wires, their distention, their arrangement with respect to the ground, their diameter, their spacing, etc., frequently vary from one vineyard to another, or even from one row of vines to another.

2. Description of Background and Relevant Invention

The invention relates to a cutting machine of the type which is described in European Patent Publication No. 0147344. This machine includes a cutting head comprising at least a cutting assembly and, preferably, two cutting assemblies; each cutting assembly is constituted by a plurality of cutting tools stacked around a common axis. The cutting tools of each of said assemblies have an offset position, in the vertical plane, with respect to the cutting tools of the other assembly, so that said assemblies can occupy, when in use, a close position according to which there is an interpenetration of the edges of the superposed cutting tools of each of said cutting assemblies in the spaces provided between the edges of the superposed cutting tools of the other cutting assembly.

Each cutting tool of the cutting assembly or cutting assemblies comprises a circular cage adapted to rotate about a rotational axis. Viewed in the direction of this axis, the circular cage has the general shape of a scalloped disk with its peripheral notches or openings extending toward the interior thereof and being demarcated by teeth. These teeth comprise an extreme right portion extending approximately along the direction of the rotational axis of the cage, and radial portions or superposed bars extending from this extreme portion toward the rotational axis, in such a manner as to form said circular cage. Each cutting tool further comprises an interior member participating in the cutting action, housed in said rotating cage. The stacking of rotating cages of the superposed cutting tools is coupled with motive means enabling the simultaneous, continuous, rotational driving of said turning cages at the same speed.

Such a cutting machine provides the numerous advantages noted in European Patent No. 0147344.

However, when this machine works in espalier-trained vines, the wires are often deformed in zigzag by the cages of the cutting tools. This phenomenon is caused by the pressure from the coppice wood that is not yet cut on the wires which are pressed in support against the extreme right portion of two teeth near certain rotating cages. This disadvantage results in a reduction in the useful life of the wires.

And moreover, in the case of vines that are very lush and thick, when the wood is not vertically or substantially vertically oriented this being particularly true in the case of the "Cabernet-Sauvignon" varieties in which the wood is very tangled—the machine comprising two stacks of cutting members has enormous difficulties in completely inserting the vines between the cutting members. The pressure exerted by these cutting members toward one another must be rather substantial, which subsequently hinders the passage of the stake. This is caused by the vigorous inclined coppice wood that rests both on the edges of the cage of a stack on one side and on the edges of the cage of a stack on the other side. Since the wood is supported on the right cage edges, it does not return to the base of the cutting member. The wood either is not cut or is incompletely cut, which results in mediocre work. In these conditions, the power of the driving motor of each stack of tools must be increased, however, such a power increase is not always compatible with the hydraulic energy of tractors.

A possibility which has likewise been considered is the making of cages provided with pointed teeth. In this case, however, the wires for espalier training inevitably penetrate between the teeth, as soon as they are no longer rigorously horizontal, and are thus cut.

SUMMARY OF THE INVENTION

An object of the present invention is to overcome the aforementioned disadvantages.

This objective is achieved by means of a machine of the above mentioned type, wherein each cutting tool comprises a rotating cage provided with peripheral notches or openings extending toward cage interior, and demarcated by. The teeth comprise an extreme portion, and also radial portions or superposed bars extending from this extreme portion toward the rotational axis. The machine being of the present invention is notable in that the indicated extreme portion forms a projecting angle, preferably a sharp angle, and in that the inclined edges of this extreme pointed portion are provided with at least one notch.

The foregoing arrangement affects the training wires that can have a tendency to slide in the direction of the cutting tools' axis, when the cutting head of the machine moves along a row of espalier-trained vines. Specifically, these wires are stopped by the notches of the extreme portions of the teeth of the rotating cages. The wires accordingly can move in height and "slip" between the cages, without penetrating between the teeth thereof, i.e. without risk of being cut.

Moreover, the pointed conformation, of the extreme portions of the teeth of the rotating cages, favors the penetration of wood inclined or flattened in the direction of the ends of the notches. This allows them to be cut completely.

BRIEF DESCRIPTION OF THE DRAWINGS

Other characteristics and advantages still others, will be better understood with the help of the description that follows and with reference to the annexed drawings.

DETAILED DESCRIPTION OF THE PREFERRED EMBODIMENTS

Reference is made to the drawings to describe an interesting, but in no way limiting, example of construction of the automatic or semi-automatic trimming or cutting machine according to the invention.

Figure 1:
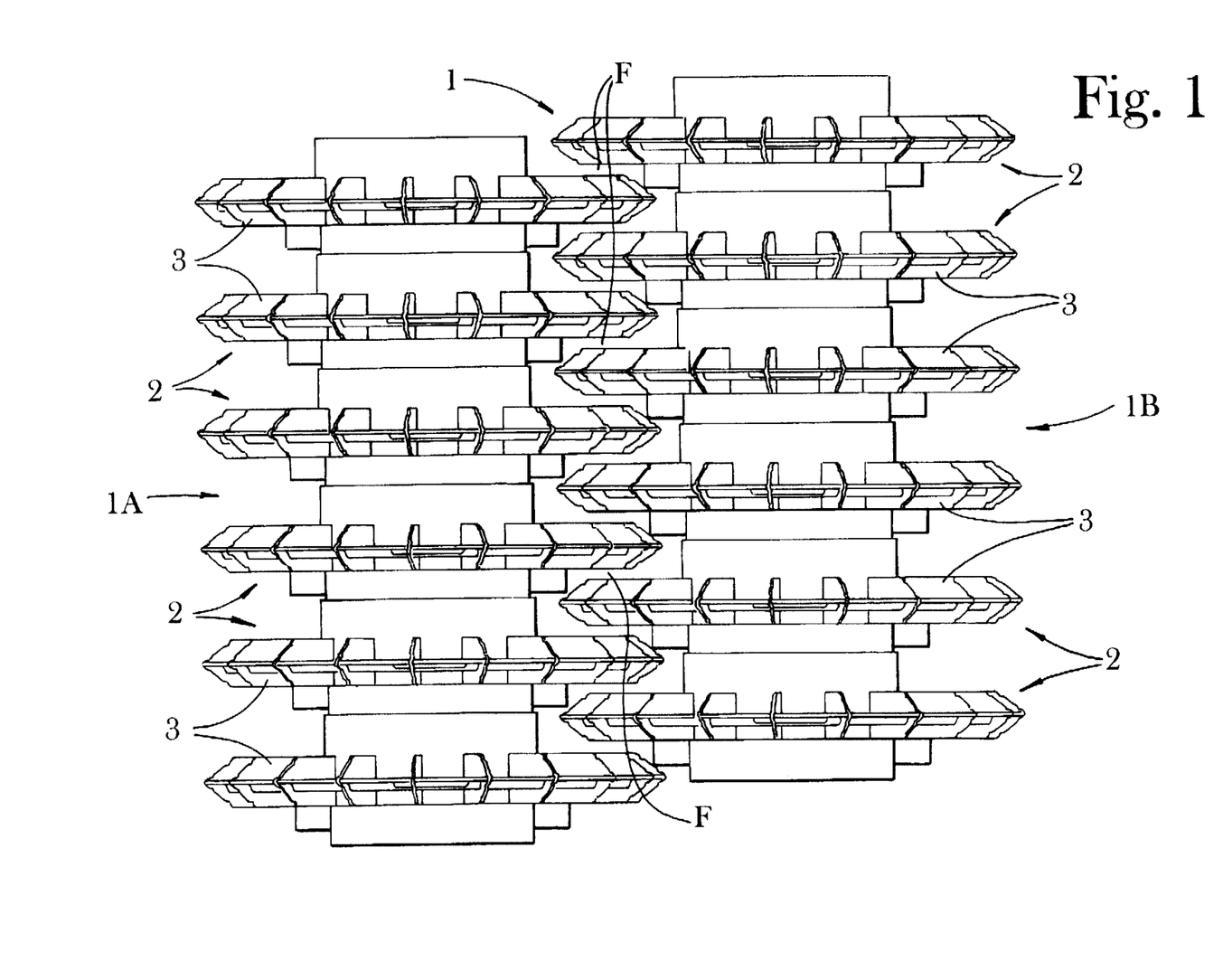
FIG. 1 is a front view, with a schematic characteristic, of two cutting assemblies shown in the close working position and in which the cutting tools are executed according to the invention.
Figure 2:
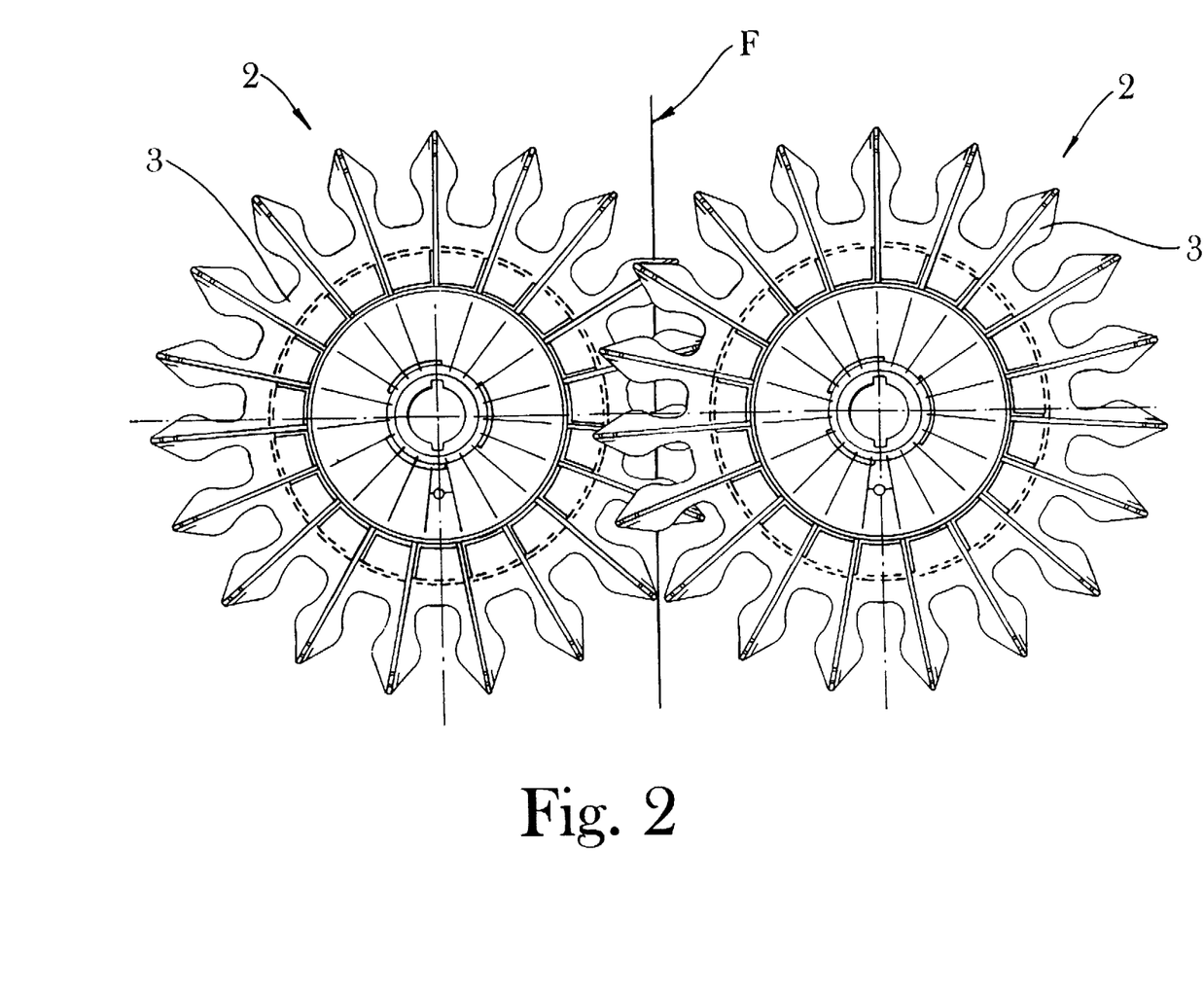
FIG. 2 is a planar view of FIG. 1.

This machine comprises a cutting head 1. As shown in FIG. 1, cutting head 1 comprises at least one cutting assembly and, preferably, two cutting assemblies 1A and 1B, or a cutting assembly and an assembly participating in the cutting action; each assembly constitutes a plurality of cutting tools 2, or by tools participating in the cutting action, stacked around an axis or common shaft. The cutting tools 2 or the tools participating in the cutting action, of each of said assemblies 1A, and 1B, are offset, in the vertical plane with respect to the tools of the other assembly. In this manner, the indicated assemblies occupy, in the operating mode, a close position wherein there is an interpenetration, of the edges of the superposed tools of each of the assemblies into the spaces provided between the edges of the superposed tools of the other assembly, as shown in FIG. 1.

Figure 4:
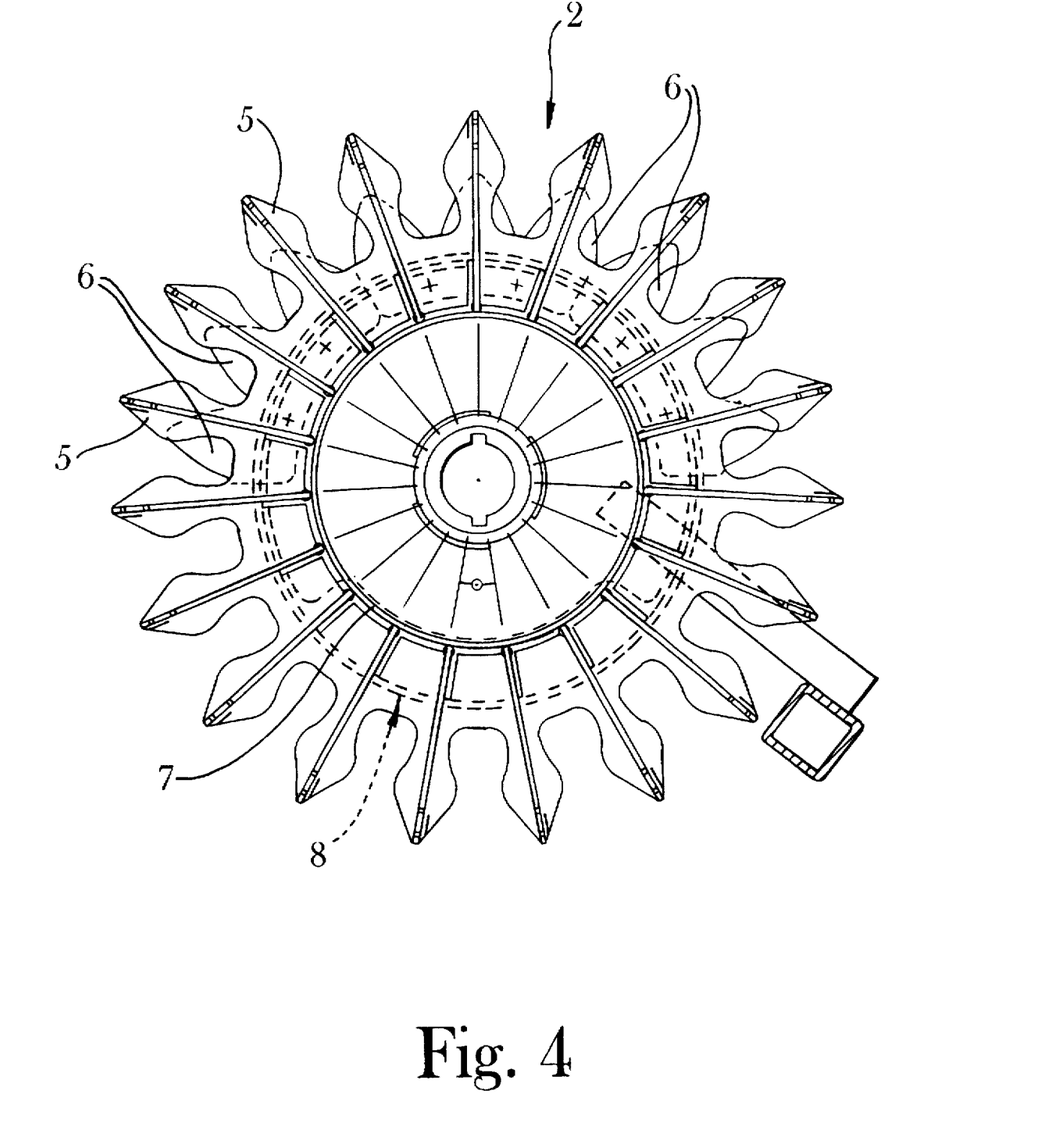
FIG. 4 is a planar view, on a smaller scale, of a cutting tool.
Figure 5:
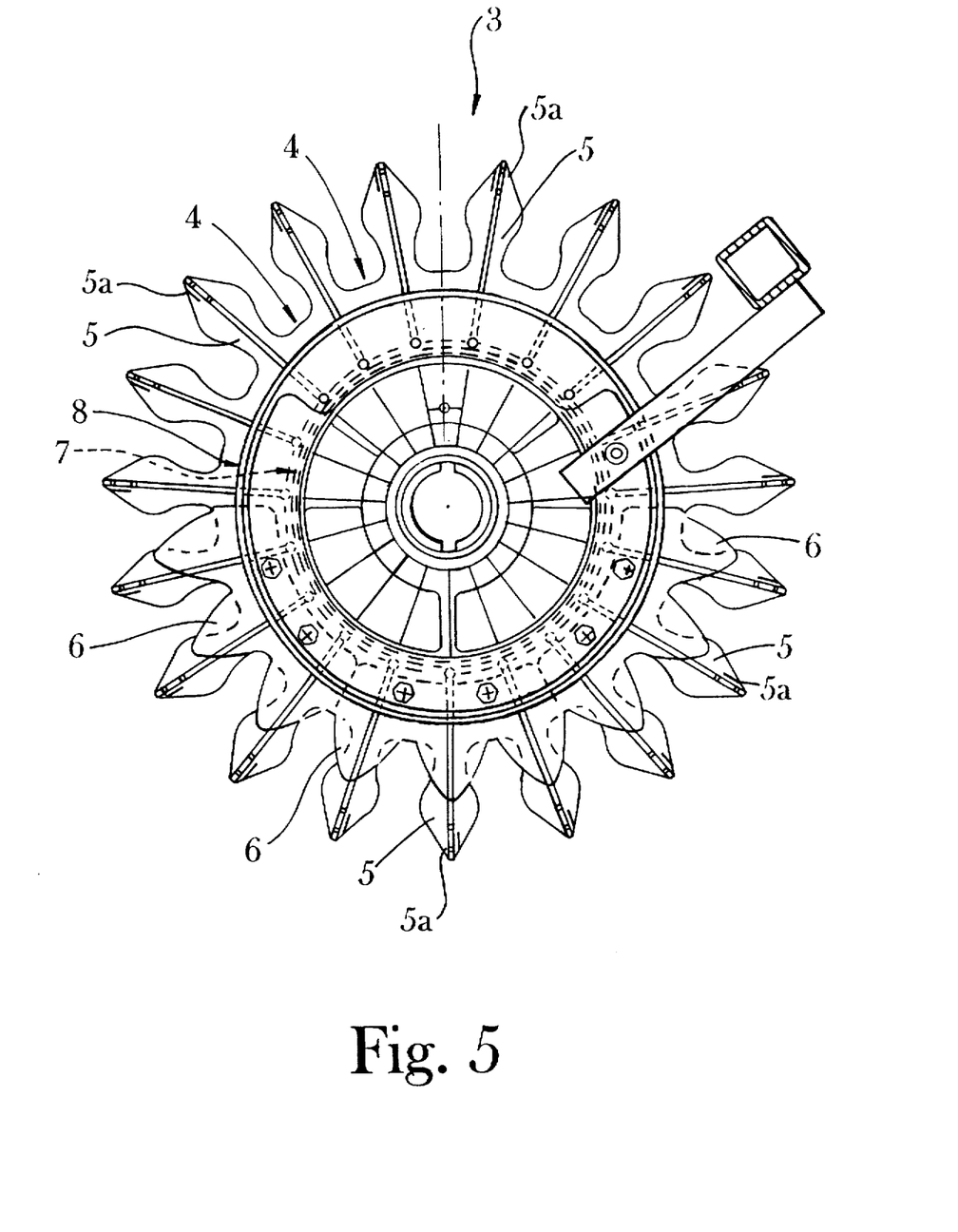
FIG. 5 is a bottom view of FIG. 4.
Figure 6:
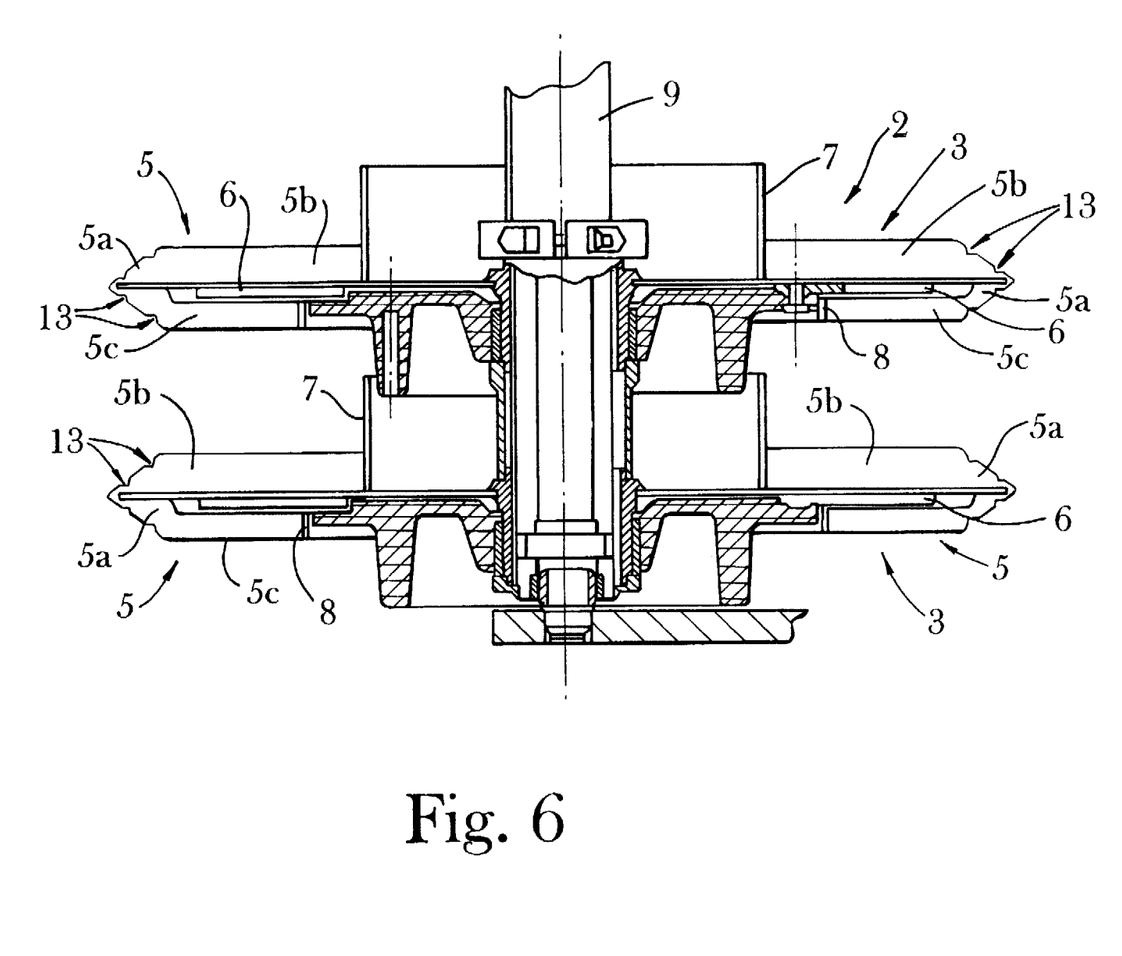
FIG. 6 is an axial cross-sectional view of a stack of cutting tools around a common axis.

Each cutting tool 2 of the cutting assembly, or of each cutting assembly 1A and 1B, comprises the following:

- a circular cage 3 adapted to rotate about a rotational axis and having, viewed in the direction of this axis, the general shape of a scalloped disk as shown in FIGS. 4 and 5, with its peripheral notches or openings 4 extending in the direction of the interior of said cage and demarcated by the teeth 5; and
- an internal member, for cutting or participating in the cutting action, which is housed in said rotating cage, and which can be constituted by fixed knives or blades 6, as illustrated in FIGS. 4–6, or by a circular saw, or by several rotative blades.

Figure 3:
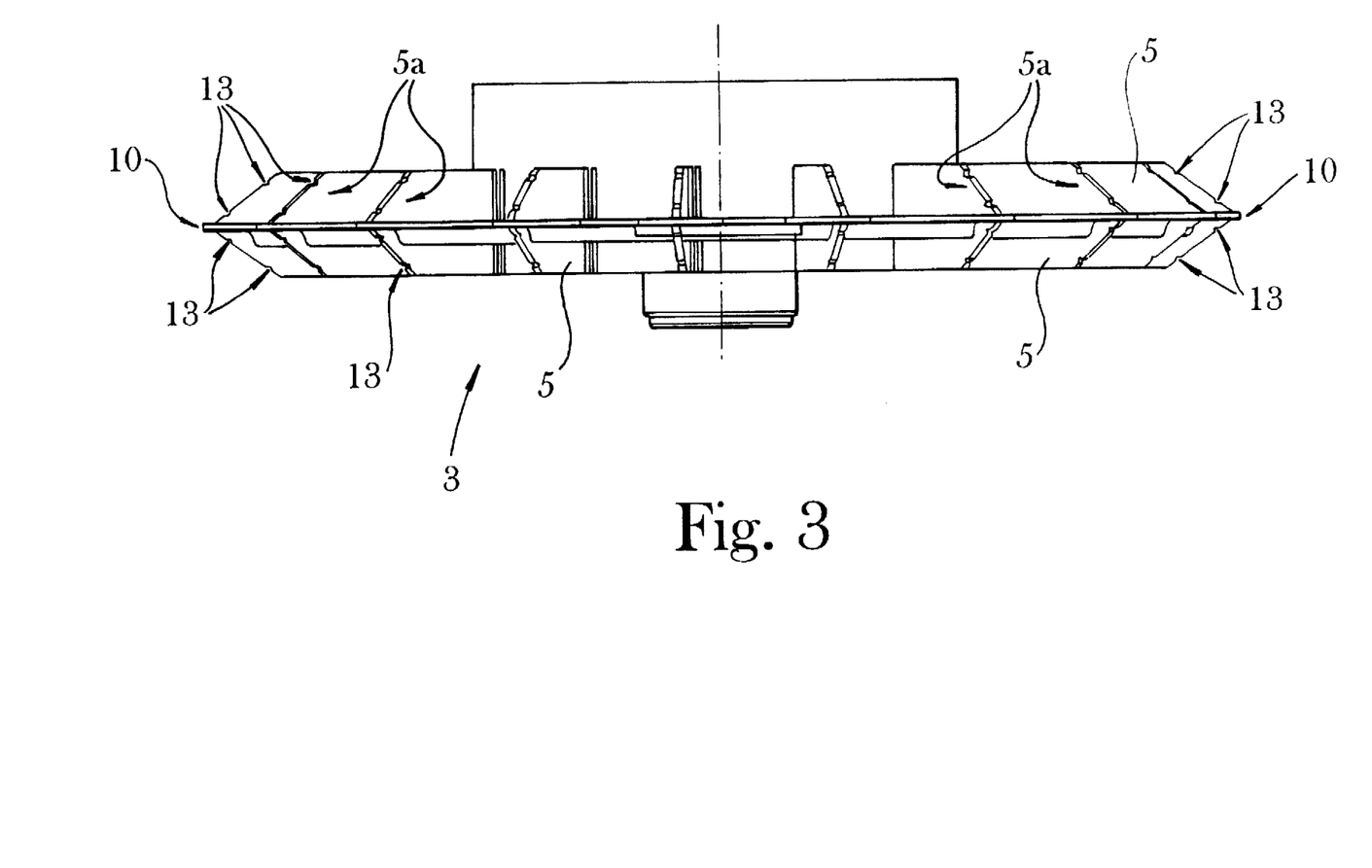
FIG. 3 is a front view of the scalloped rotating cage of a cutting tool.

The teeth 5 of each circular cage 3 comprise, notably, one extreme portion 5a and radial portions or superposed bars 5b and 5c. Radial portions or superposed bars 5a and 5c extend from this extreme portion 5a in the direction of the rotational axis, in such a way as to form the circular cage. The internal ends of the radial portions 5b and 5c are, for example, rigidly assembled to cylindrical envelopes or belts 7 and 8, respectively, constituting the central portion of the cage 3.

The stack of rotating cages 3, of the superposed cutting tools 2, is coupled with motive means, such as described in European Patent Publication No. 0 147 244. This motive means enables the simultaneous and continuous rotational driving at the same speed, of the rotating cages 3 of each cutting assembly 1A and 1B stacked around the axis or common shaft 9 of said assembly.

The pivoting cradles for the support of the cutting assemblies, or for the support of the cutting assembly and the assembly participating in the cutting action, are not described. Neither is there description of the suspension frame of the cutting head comprising these assemblies. Preferred examples of these elements are described in European Patent Publication No. 0147344 and they do not enter into the scope of the present application.

Figure 7:
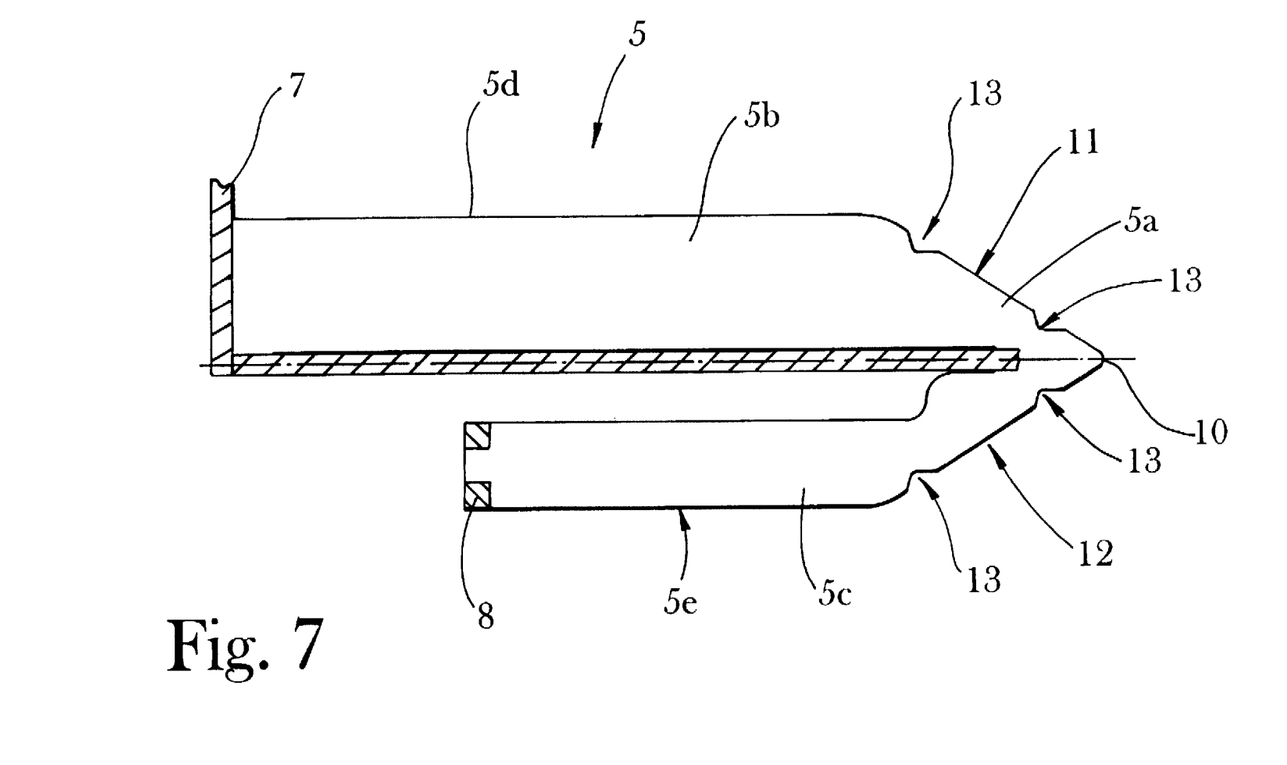
FIG. 7 is a front view, with a partial cross-section, of a tooth of a rotative cage of a cutting tool.

The extreme portion 5a of the teeth 5 of the rotating cages 3 forms a projecting angle. Specifically, this extreme portion has a point 10 and two inclined edges 11, 12 extending from the point 10 to the upper and lower radial edges, 5d and 5e, of the radial portions 5b and 5c, respectively, of the said teeth.

As a significant feature of the invention, the inclined edges 11 and 12 of the pointed extreme portion 5c of the teeth 5 are provided with at least one notch 13. Preferably, each inclined edge 11, 12 is provided with at least two spaced notches.

The projecting angle formed by the extreme portion 5a of the teeth 5 is, advantageously, a sharp angle. The value of this angle is, for example, on the order of 70 degrees, with each sloped edge 11 and 12 having an inclination on the order of 35 degrees with respect to the radius passing through point 10 of the tooth. However, these angles are not limited to the foregoing values; in this regard, the extreme portion 5a can be more or less pointed.

Further, the notches can preferably have a profile forming an angle of between 90 and 120 degrees, wherein the bisector is perpendicular to the sloped edges 11, 12. However, this shape is not limiting; what is essential is that the shape of the notches are able to oppose the free sliding of the training wires in the direction of the upper and lower radial edges 5d and 5e of the radial portions 5b and 5c, respectively, of the teeth 5.

Due to the characteristic arrangements of the invention, when the machine moves, during operation, the training wires F pass very easily from one stage to another of the cutting head. This movement can occur without damage to said wires F, these wire, in one direction or the other, can pass over the edges of the multistage cutting tools of the cutting head, or more exactly the ends of the teeth of the said tools, without being driven between the latter, i.e., without being severed.

Otherwise, the training wires F can "slip" vertically between the tools that are in a position of interpenetration, without being cut. This feature constitutes a very important result.

I claim:

1. A machine for the trimming or cutting of vines and espalier-trained trees or shrubs, comprising a cutting head;

the cutting head comprising two assemblies, the two assemblies including:
   (a) a first cutting assembly having a first axis; and
   (b) a second cutting assembly having a second axis offset from the first axis each of the two assemblies comprising a plurality of cutting tools, the tools having edges, and being stacked about a common axis or shaft to provide spaces between the tools' edges;

the tools of each of the two assemblies being offset in the vertical plane with respect to the tools of the other of the two assemblies, so that during operation the two assemblies can occupy a close position wherein there is an interpenetration of the edges of the tools of each of the two assemblies into the spaces provided between the edges of the tools of the other of the two assemblies, with the tools of each of the two assemblies accordingly being superposed with respect to the tools of the other of the two assemblies;

each cutting tool comprising a circular cage and further comprising an interior member participating in the cutting action and being housed in the circular cage, whereby each plurality of cutting tools provides a stack of circular cages;

each circular cage being adapted to rotate about a rotational axis along the common axis or shaft, and having the general shape of a scalloped disk with notches or openings extending radially toward the interior thereof and being demarcated by teeth;

the teeth comprising a radially outer extreme portion and radial portions extending from the extreme portion in the direction toward the rotational axis, the extreme portion forming a projecting angle formed by inclined edges which comprise at least one notch;

a plane which is perpendicular to the rotational axis extending through the projecting angle at the radially outermost point of the extreme portion;

each stack of circular cages being coupled with motive means enabling the simultaneous and continuous rotational driving of the circular cages at the same speed.

2. The machine according to claim 1, wherein the one notch comprises at least two spaced notches.

3. The machine according to claim 1, wherein the projecting angle is an acute angle.

4. The machine according to claim 3, wherein the inclined edges form an angle on the order of 70 degrees.

5. The machine according to claim 4, wherein each inclined edge has an inclination on the order of 35 degrees with respect to the radius bisecting the angle formed by the inclined edges.

6. The machine according to claim 1, wherein the at least one notch has a profile forming an angle of between 90 and 120 degrees, wherein the bisector is perpendicular to the inclined edges.

7. A machine for the trimming or cutting of vines and espalier-trained trees or shrubs, comprising a cutting head;

the cutting head comprising two assemblies, the two assemblies including;
  (a) a first cutting assembly having a first axis; and
  (b) a further assembly participating in the cutting action, and having an axis offset from the first axis;

the first cutting assembly comprising a plurality of cutting tools and the further assembly comprising a plurality of tools participating in the cutting action, the tools having edges, and being stacked about a common axis or shaft to provide spaces between the tools' edges;

the tools of each of the two assemblies being offset in the vertical plane with respect to the tools of the other of the two assemblies, so that during operation the two assemblies can occupy a close position wherein there is an interpenetration of the edges of the tools of each of the two assemblies into the spaces provided between the edges of the tools of the other of the two assemblies, with the tools of each of the two assemblies accordingly being superposed with respect to the tools of the other of the two assemblies;

each cutting tool comprising a circular cage and further comprising an interior member participating in the cutting action and being housed in the circular cage, whereby each plurality of cutting tools provides a stack of circular cages;

each circular cage being adapted to rotate about a rotational axis along the common axis or shaft, and having the general shape of a scalloped disk with notches or openings extending radially toward the interior thereof and being demarcated by teeth;

the teeth comprising a radially outer extreme portion and radial portions extending from the extreme portion in the direction toward the rotational axis, the extreme portion forming a projecting angle formed by inclined edges which comprise at least one notch;

a plane which is perpendicular to the rotational axis extending through the projecting angle at the radially outermost point of the extreme portion;

each stack of circular cages being coupled with motive means enabling the simultaneous and continuous rotational driving of the circular cages at the same speed.

8. The machine according to claim 7, wherein the one notch comprises at least two spaced notches.

9. The machine according to claim 7, wherein the projecting angle is an acute angle.

10. The machine according to claim 9, wherein the inclined edges form an angle on the order of 70 degrees.

11. The machine according to claim 10, wherein each inclined edge has an inclination on the order of 35 degrees with respect to the radius bisecting the angle formed by the inclined edges.

12. The machine according to claim 7, wherein the at least one notch has a profile forming an angle of between 90 and 120 degrees, wherein the bisector is perpendicular to the inclined edges.

* * * * *